No. 890,853. PATENTED JUNE 16, 1908.
M. FESSLER.
APPARATUS FOR SOLDERING CHAIN LINKS.
APPLICATION FILED JULY 11, 1907.

Witnesses.
S. Brashears
Frank Linum

Inventor,
Max Fessler
by
His Attorney

UNITED STATES PATENT OFFICE.

MAX FESSLER, OF PFORZHEIM, GERMANY.

APPARATUS FOR SOLDERING CHAIN-LINKS.

No. 890,853.

Specification of Letters Patent.

Patented June 16, 1908.

Application filed July 11, 1907. Serial No. 383,361.

*To all whom it may concern:*

Be it known that I, MAX FESSLER, a subject of the German Emperor, residing at Pforzheim, Baden, German Empire, have invented certain new and useful Improvements in Apparatus for Soldering Chain-Links, of which the following is a specification.

In the manufacture of chains, more especially ornamental chains of all kinds, from wire furnished with a core of solder, a process has been proposed, according to which the links are immersed in a deoxidizing solution and after evaporation of the adhering moisture, the crystals of the deoxidizing agent, with the exception of those at the actual joints, removed, whereupon, to prevent the links from getting soldered together, the chain is coated with a protective mass, prior to being heated to melt the solder core and thus shut the joints of the links. My invention relates to apparatus for carrying out such a process.

Figure 1:
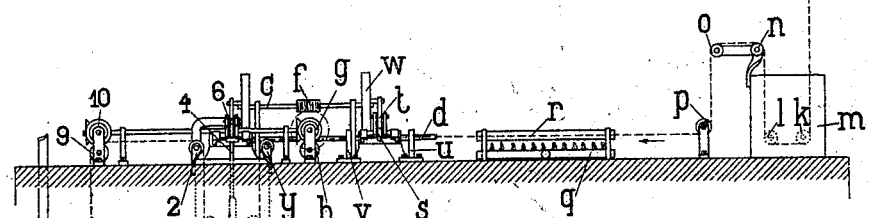
Figure 3:
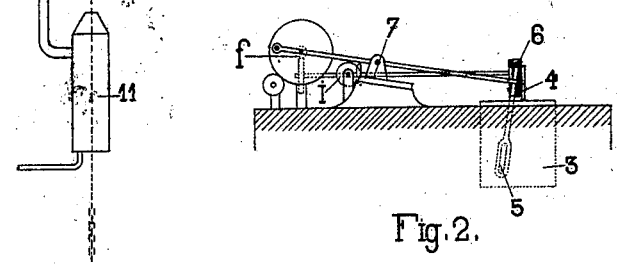
Figure 2:
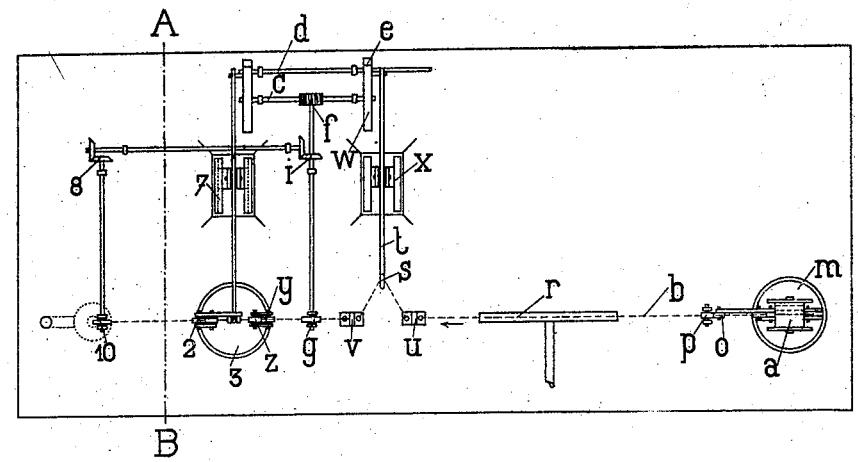

In the accompanying drawing—Figure 1 is a front elevation of my new plant. Fig. 2 is a plan thereof. Fig. 3 is a section on the line A—B of Fig. 2.

The chain $b$, whose unsoldered links are of solder cored wire, is wound upon the drum $a$, from which it is slowly drawn in the direction of the arrow by passing between two rubber rollers $g, h$. The roller $g$ is mounted on a shaft which is driven off the main shaft $d$ by means of friction wheels $e, w$, countershaft C and worm gearing $f$. On leaving the drum $a$ the chain $b$ passes below two guide pulleys $k, l$ located in a tank $m$, filled with a soldering fluid (deoxidizing agent). Here the faces of the joints to be soldered are sufficiently pickled or etched, and the surface of the links adequately cleansed. The chain then passes over a second pair of guide pulleys $n$, O and thence under a guide pulley $p$ direct through the pipe $r$ heated by a Bunsen burner apparatus $q$, whereby the solvent is vaporized, that is, the water added to the soldering salts is evaporated.

In order to remove the dry crystals of the soldering salt from the links, except at the joints to be soldered, the chain is led through the eye S of a crank rod $t$, which works between two eyes $u$, V. This rod $t$ is actuated by the disk crank W (which also constitutes a friction wheel) mounted on the shaft C, and receives guidance from a slide block reciprocating in guides X. Owing to the rotary and advancing motion of the chain, the links rub and scrape against each other and against the eyes $u$, V, so that the crust of salt is removed from the surface, while the actual joints are not affected by this treatment. The chain then passes over a guide pulley $y$, under two like pulleys Z, 1, located in a tank 3, and up over a fourth pulley 2. The tank 3 contains a suitable protective mass which tends to prevent soldering, and the chain is moved to and fro in the mass by being passed through the slot 5 in a rod 4 having an oscillatory motion. The rod 4 is suspended so as to swing at the point 6, and receives its oscillatory motion by means of a crank rod which is operated by a disk crank on the shaft C and is guided by the slide block and guides 7, in the same manner as the crank rod $t$. In this way the various links are brought into intimate connection with the protective mass and all parts of the links, including the joints, get coated over with a film which is sufficient to prevent the links becoming soldered one to the other. The chain is then conducted further by means of a second pair of rubber rollers 9, 10, the latter of which is mounted on a shaft which is also driven off the countershaft C with the aid of shafting and bevel gearing I, 8. After passing the rollers 9, 10 the chain drops by gravity and passes at a suitable speed through the flame of a Bunsen burner, or a soldering furnace 11, or in the event of stout links, through a blowpipe flame, which heats the links to such extent that the solder they contain is melted and shuts the joints in a well-known manner.

Having thus described my invention, what I claim as new is—

Apparatus for continuously shutting the joints of the links of a chain of solder cored wire, comprising in combination, a vessel of soldering fluid, a heating contrivance, two eyes through which the chain passes after having been drawn through said fluid and exposed to heat, means for imparting a rotary motion to the piece of chain for the time being located between said eyes, a pair of rollers for drawing the chain through the said apparatus, a vessel of protective material, a second pair of rollers for drawing the chain through said material, and means for heating the chain for the purpose of melting the core, substantially as described.

In testimony whereof I affix my signature in presence of two witnesses.

MAX FESSLER.

Witnesses:
 FRANZ ANTON HUBLUCH,
 RAYMOND H. FISHER.